United States Patent [19]

Akahori

[11] Patent Number: 5,386,408
[45] Date of Patent: Jan. 31, 1995

[54] OPTICAL RECORDING CARRIER AND OPTICAL RECORDING PROCESS

[75] Inventor: Takashi Akahori, Tokyo, Japan

[73] Assignee: Ricoh Company, Ltd., Tokyo, Japan

[21] Appl. No.: 89,673

[22] Filed: Jul. 7, 1993

[30] Foreign Application Priority Data

Jul. 7, 1992 [JP] Japan .................................. 4-201832

[51] Int. Cl.[6] .............................................. B41M 5/30
[52] U.S. Cl. .................. 369/100; 369/275.4; 369/284
[58] Field of Search .............. 369/275.1, 275.2, 275.4, 369/100, 116, 59, 283, 284

[56] References Cited

U.S. PATENT DOCUMENTS

| | | | |
|---|---|---|---|
| 5,219,820 | 6/1993 | Morohoshi et al. | 503/204 |
| 5,260,254 | 11/1993 | Hotta et al. | 428/694 |
| 5,273,950 | 12/1993 | Fukaya et al. | 503/208 |
| 5,278,128 | 1/1994 | Hotta et al. | 503/207 |
| 5,283,220 | 2/1994 | Kawaguchi et al. | 503/200 |

Primary Examiner—Paul M. Dzierzynski
Assistant Examiner—Don Wong
Attorney, Agent, or Firm—Cooper & Dunham

[57] ABSTRACT

This optical recording medium is constructed by a substrate, a protecting film, an optical recording material layer, a light reflecting layer and a protecting layer sequentially laminated with each other. The substrate is made of a transparent material. The protecting film is made of transparent optical hardening resin. The optical recording material layer has a transparency reversibly changed in accordance with temperature. The optical recording material layer is formed by an optical recording material in which an organic low molecular substance of higher saturated fatty acid such as stearic acid or behenic acid, etc. is uniformly dispersed in a transparent resin base material composed of thermoplastic resin such as vinyl chloride resin, etc. as a high molecular compound.

17 Claims, 7 Drawing Sheets

OPTICAL RECORDING CARRIER AND OPTICAL RECORDING PROCESS

BACKGROUND OF THE INVENTION

1. Field of the Invention

The present invention relates to an optical recording carrier and an optical recording process which can reduce a data access time and increase a data recording capacity.

2. Description of the Related Art

In general, a write-once type optical disk, a magnetooptic disk and a phase-changing type optical disk are practically used as an optical recording medium utilizing an optical recording material.

However, such a general optical recording medium has the following disadvantages.

Namely, the write-once type optical disk can record data, but cannot rewrite data by erasing the recorded data, therefore one disadvantage is that a utilizing range of this optical disk is narrow.

In contrast to this, the magnetooptic disk can rewrite data, but it is necessary to provide a magnetic head for generating an auxiliary magnetic field for recording and erasing data on the magnetooptic disk. Therefore, the cost of a device using the magnetooptic disk as a recording medium is increased. When data are rewritten, it is necessary to erase the recorded data once. This results in increasing a time required for rewriting a data and increasing a data access time. For example, a two-beam system, a magnetic field modulating system, an optical modulating system using an initializing magnet by an exchange coupling multiple layer medium, etc. are practically used as a device capable of performing a data rewriting operation by one disk access using the magnetooptic disk. However, this device has a complicated structure and cost of this device is increased. Further, manufacturing yield of the used recording medium is bad and cost of the recording medium is increased.

In the phase-changing type optical disk, an optical recording material is constructed by a thin phase-changing optical recording film of In-Se-Tl-Co elements, In-Sb-Te elements, Ge-Sb-Se elements, etc. to perform a data rewriting operation by one disk access. However, in the phase-changing type optical recording film, the temperature of a light irradiating portion is set to a temperature equal to or higher than a melting point at a data recording time. Accordingly, it is necessary to set the output level of a laser beam to be very high. Therefore, the life of a semiconductor laser element for outputting the laser beam is short, or a large heating amount of the semiconductor laser element prevents the device interior from being fully cooled. Further, the temperature of the phase-changing type optical recording film at the data recording time is set to a very high temperature such as 400° to 800° C. Accordingly, a protecting layer of the phase-changing type recording film must have characteristics in which no protecting layer is melted and decomposed and it is possible to prevent the recording film from being deformed at the recording time. Therefore, the protecting layer is constructed by a special layer so that the cost of a recording medium is increased.

SUMMARY OF THE INVENTION

It is therefore an object of the present invention to provide an optical recording carrier and an optical recording process in which data can be rewritten by one disk access and costs of a recording medium and a disk unit can be reduced.

To achieve the above object, the present invention resides in an optical recording carrier comprising a substrate made of a transparent material; an optical recording layer having a transparency reversibly changed in accordance with temperature; and a reflecting layer for reflecting a light which passes through the substrate and the optical recording layer; the substrate, the optical recording layer and the reflecting layer being laminated with each other.

According to another feature of the invention the optical recording layer is made of an optical recording material including a resin base material into which an organic low molecular substance is dispersed.

The present invention also resides in an optical recording process using an optical recording carrier as a recording medium; the optical recording carrier comprising a substrate made of a transparent material; an optical recording layer which is made of an optical recording material obtained by dispersing an organic low molecular substance in a resin base material and has a transparency reversibly changed in accordance with temperature; and a reflecting layer for reflecting a light which passes through the substrate and the optical recording layer; the substrate, the optical recording layer and the reflecting layer being laminated with each other; the optical recording process comprising the steps of setting the recording layer to be in an opaque state at an initial operating time of the optical recording carrier; controlling and setting the output level of a laser beam having a predetermined spot diameter to a value provided such that a temperature of the recording medium in a bit position corresponding to a marked position of recorded data is increased to a first predetermined temperature for setting the recording layer to the opaque state at a data recording time; controlling and setting the output level of the laser beam to a value provided such that the temperature of the recording medium in a bit position except for the marked position is increased to a second temperature for setting the recording layer to a transparent state and lower than the first predetermined temperature at the data recording time; and controlling and setting the output level of the laser beam to a value provided such that the temperature of the recording layer is set to a third temperature lower than the second temperature at a data reproducing time.

The present invention also resides in an optical recording process using an optical recording carrier as a recording medium; the optical recording carrier comprising a substrate made of a transparent material; an optical recording layer which is made of an optical recording material obtained by dispersing an organic low molecular substance in a resin base material and has a transparency reversibly changed in accordance with temperature; and a reflecting layer for reflecting a light which passes through the substrate and the optical recording layer; the substrate, the optical recording layer and the reflecting layer being laminated with each other; the optical recording process comprising the steps of setting the recording layer to be in a transparent state at an initial operating time of the optical recording carrier; controlling and setting the output level of a laser beam having a predetermined spot diameter to a value provided such that a temperature of the recording medium in a bit position except for a marked position of recorded data is increased to a first predetermined temperature for setting the recording layer to an opaque state at a data recording time; controlling and setting the output level of the laser beam to a value provided such that the temperature of the recording medium in a bit position corresponding to the marked position is increased to a second temperature for setting the recording layer to the transparent state and lower than the first predetermined temperature at the data recording time; and controlling and setting the output level of the laser beam to a value provided such that the temperature of the recording layer is set to a third temperature lower than the second temperature at a data reproducing time.

The present invention also resides in an optical recording process using an optical recording carrier as a recording medium; the optical recording carrier comprising a substrate made of a transparent material; an optical recording layer which is made of an optical recording material obtained by dispersing an organic low molecular substance in a resin base material and has a transparency reversibly changed in accordance with temperature; and a reflecting layer for reflecting a light which passes through the substrate and the optical recording layer; the substrate, the optical recording layer and the reflecting layer being laminated with each other; the optical recording process comprising the steps of setting the recording layer to be in an opaque state at an initial operating time of the optical recording carrier; and controlling and setting the output level of a laser beam having a predetermined spot diameter to a value provided such that a temperature of the recording medium in each of bit positions is increased to a temperature for setting the recording layer to an opaque state corresponding to a value of multivalued recording data at a data recording time.

The present invention also resides in an optical recording process using an optical recording carrier as a recording medium; the optical recording carrier comprising a substrate made of a transparent material; an optical recording layer which is made of an optical recording material obtained by dispersing an organic low molecular substance in a resin base material and has a transparency reversibly changed in accordance with temperature; and a reflecting layer for reflecting a light which passes through the substrate and the optical recording layer; the substrate, the optical recording layer and the reflecting layer being laminated with each other; the optical recording process comprising the steps of setting the recording layer to be in a transparent state at an initial operating time of the optical recording carrier; and controlling and setting the output level of a laser beam having a predetermined spot diameter to a value provided such that a temperature of the recording medium in each of bit positions is increased to a temperature for setting the recording layer to an opaque state corresponding to a value of multivalued recording data at a data recording time.

Thermoplastic resin is preferably used as the resin base material and higher saturated fatty acid is preferably used as the organic low molecular substance.

Accordingly, data can be recorded, reproduced and erased by using a laser beam having a low output. An operating state of the recording medium can be inverted by one access operation. Accordingly, the recorded data can be rewritten by one access operation so that a data access time can be greatly reduced. Further, since multivalued data can be recorded in the recording layer by varying the transparency thereof discretely or continuously, a recording capacity of data can be greatly increased.

Further objects and advantages of the present invention will be apparent from the following description of the preferred embodiments of the invention as illustrated in the accompanying drawings.

DESCRIPTION OF THE PREFERRED EMBODIMENTS

The preferred embodiments of an optical recording carrier and an optical recording process in the present invention will next be described in detail with reference to the accompanying drawings.

Figure 1:
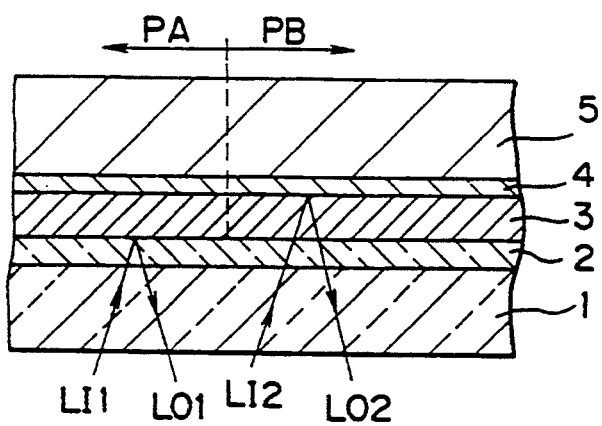
FIG. 1 is a cross-sectional view illustrating a recording medium in accordance with one embodiment of the present invention.

FIG. 1 shows the structure of an optical recording medium in accordance with one embodiment of the present invention.

In FIG. 1, this optical recording medium is provided with a substrate 1, a protecting film 2, an optical recording material layer 3, a light reflecting layer 4 and a protecting layer 5 which are sequentially laminated with each other. The substrate 1 is constructed by a transparent material. The protecting film 2 is made of transparent optical hardening resin. The optical recording material layer 8 has a transparency reversibly changed in accordance with temperature. The light reflecting layer 4 is constructed by a material for reflecting light. The protecting layer 5 protects the light reflecting layer 4.

The optical recording material layer 3 is formed by an optical recording material in which an organic low molecular substance of higher saturated fatty acid such as stearic acid or behenic acid, etc. is uniformly dispersed in a transparent resin base material composed of thermoplastic resin such as vinyl chloride resin, etc. as a high molecular compound. The protecting layer 2 is disposed to protect the optical recording material layer 3.

Figure 2:
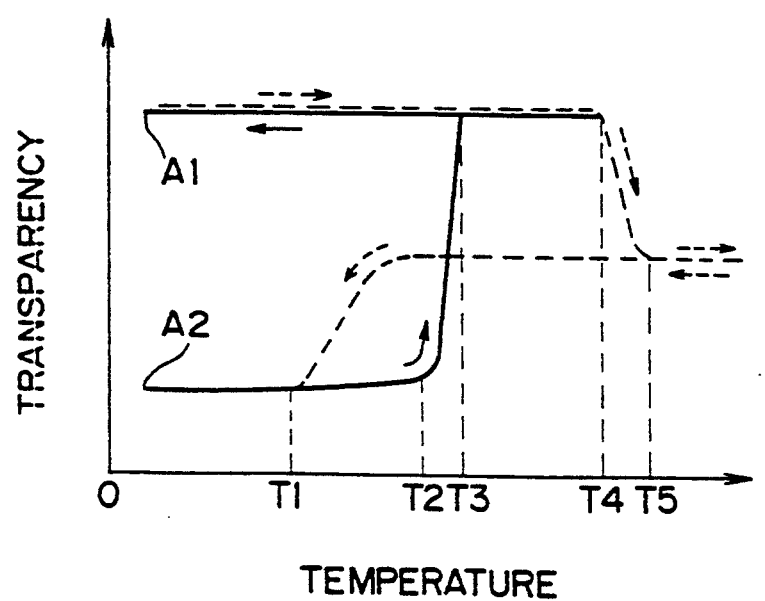
FIG. 2 is a graph for explaining optical characteristics of an optical recording material used in the recording medium in FIG. 1.

FIG. 2 illustrates optical characteristics of the optical recording material used for the optical recording material layer 3.

In FIG. 2, a solid line shows a transition of the optical recording material changed from an opaque state (A2) to a transparent state (A1). A broken line in FIG. 2 shows transition of the optical recording material changed from the transparent state to the opaque state.

Namely, when the optical recording material is heated from the opaque state (A2), the transparency of the optical recording material is improved after the temperature of the optical recording material exceeds temperature T2. The optical recording material becomes completely transparent when the temperature of the optical recording material exceeds temperature T3. The transparent state of the optical recording material is held when heating of the optical recording material is stopped and the optical recording material is cooled in a state in which the temperature of the optical recording material does not exceed temperature T4.

When the optical recording material is heated from the transparent state (A1), the transparency of the optical recording material is reduced and the optical recording material gradually becomes opaque after the temperature of the optical recording material exceeds temperature T4. No transparency of the optical recording material is reduced any more when the temperature of the optical recording material exceeds temperature T5. Therefore, when the heating of the optical recording material is stopped and the optical recording material is cooled, the temperature of the optical recording material is gradually reduced and is lower than temperature T2, the transparency of the optical recording material is gradually reduced again. When the temperature of the optical recording material is equal to or lower than temperature T1, the optical recording material becomes completely opaque. Thereafter, this opaque state of the optical recording material is held.

For examples, the above temperatures T1, T2, T3, T4 and T5 are respectively set to 40°, 70°, 80°, 110° and 140° C. These temperature values are varied in accordance with kinds of the organic low molecular substance used in the optical recording material. Accordingly, an optical recording material having required optical characteristics can be obtained by suitably selecting the kinds of the used optical recording material.

When a portion of the recording medium in FIG. 1 is heated to a temperature equal to or higher than temperature T5 and is cooled, the heated portion becomes opaque. The symbol PA in FIG. 1 shows this opaque portion. With respect to this opaque portion PA, incident light LI1 from the substrate 1 is reflected on a surface of the optical recording material layer 3. An intensity level of reflected light LO1 from the opaque portion PA is provided in accordance with a surface reflectivity of the optical recording material layer 3 in the opaque state.

In contrast to this, with respect to a transparent portion PB of the recording medium shown in FIG. 1, incident light LI2 from the substrate 1 is reflected on a surface of the reflecting layer 4. Accordingly, an intensity level of reflected light LO2 from this transparent portion PB is provided in accordance with a surface reflectivity of the reflecting layer 4.

The surface reflectivity of the optical recording material layer 3 in the opaque state is smaller than that of the reflecting layer 4. Accordingly, the intensity level of the reflected light LO1 is lower than that of the reflected light LO2. Therefore, when a difference in intensity level between the reflected lights LO1 and LO2 is detected, it is possible to judge a surface state of the recording medium. In this case, this surface state is equivalent to a transparent state of the optical recording material layer 3.

Thus, binary data can be recorded to the recording medium in FIG. 1 by making data values 0 and 1 respectively correspond to the transparent and opaque states of the optical recording material layer 3.

Figure 3:
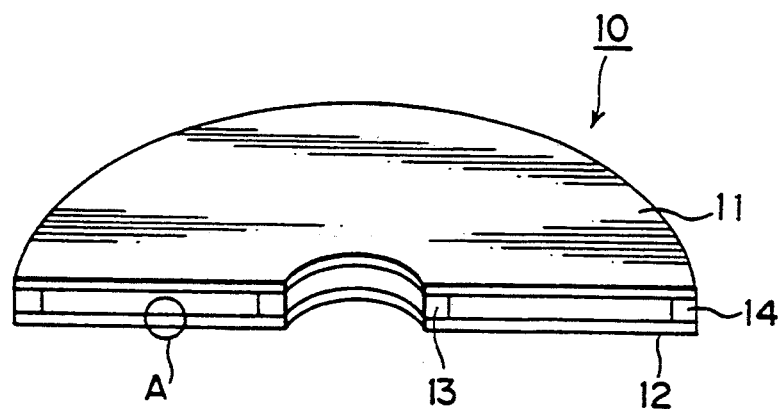
FIG. 3 is a schematic sectional view and a partially enlarged view showing one example of an optical disk constructed by using the recording medium in FIG. 1.
Figure 4:
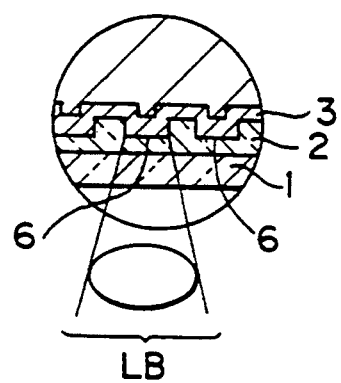
FIG. 4 is an enlarged sectional view of a portion of the optical disk in FIG. 3.

FIG. 3 show one example of an optical disk 10 constructed by using the recording medium in FIG. 1. FIG. 4 shows enlarged sectional view of the portion A of the optical disk in FIG. 3.

In this optical disk 10, two disk plates 11 and 12 as a recording medium are molded in the shape of a disk. The disk plates 11 and 12 are stuck to each other in a state in which a substrate 1 of the optical disk 10 is externally located and spacers 13 and 14 are arranged between the disk plates 11 and 12.

In this case, as shown in FIG. 4, many concentric guide grooves 6 are formed in the recording medium. A recording track for recording data is formed in each of the guide grooves 6 in the case of a groove recording type. A laser beam LB for recording, reproducing and erasing data is guided along each of the guide grooves 8.

Figure 5:
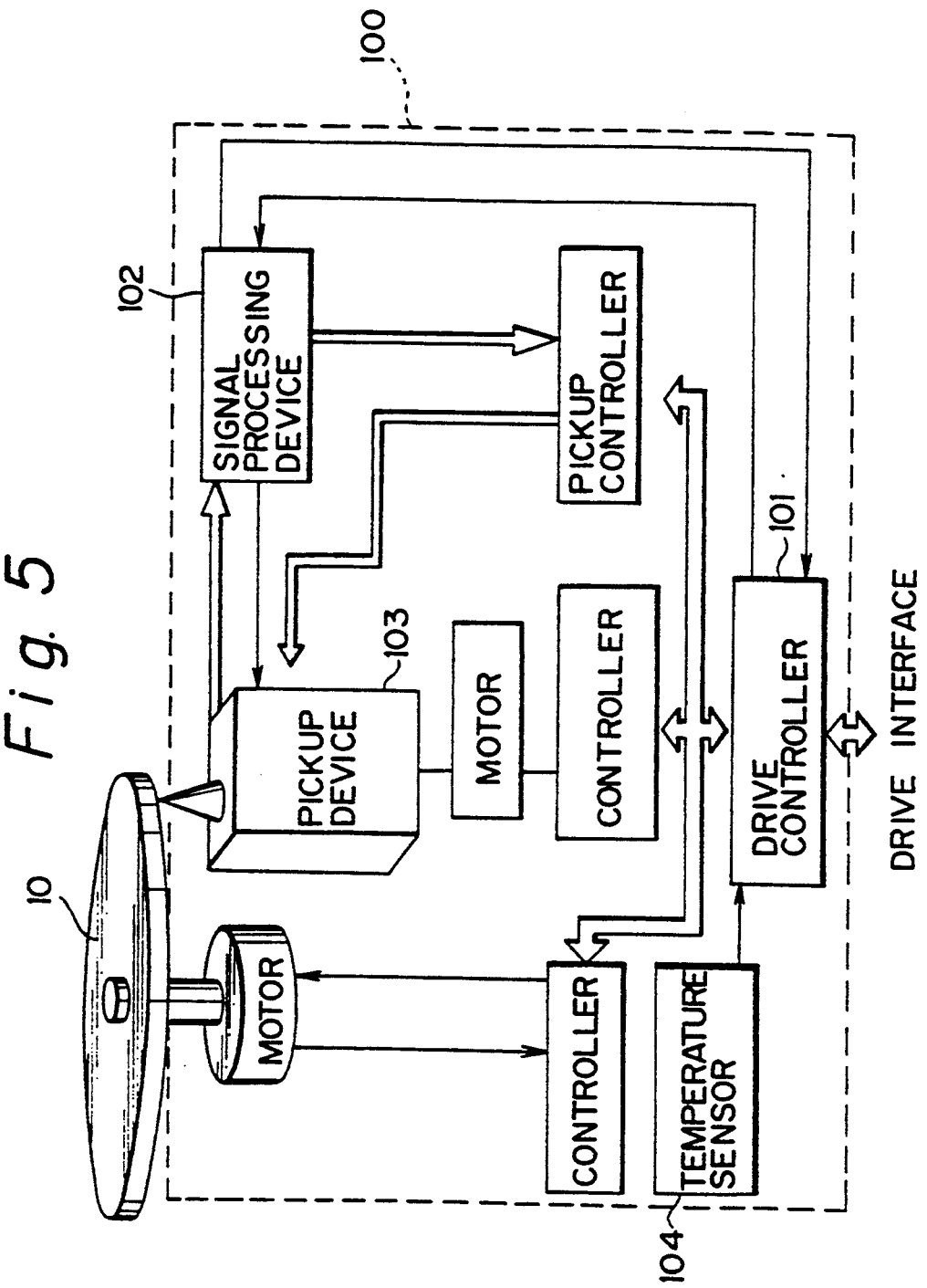
FIG. 5 is a schematic block diagram of an optical disk drive unit.

The basic construction of an optical disk drive unit will next be described with reference to FIG. 5.

When data are recorded to an optical disk medium 10 by commands of a drive controller 101 provided in the disk drive unit 100, a laser beam is irradiated onto the optical disk medium 10 with a signal processing device 102 and an optical pickup device 103 provided in the disk drive unit 100. When the recorded data are reproduced, reproducing commands are transmitted from the drive controller 101 and similar to the recording time, a laser beam is irradiated onto the optical disk medium 10. The laser beam reflected on the optical disk medium 10 is received by the optical pickup device 103. The received light beam is processed as a signal by the signal processing device 102 and this processed signal is transmitted to the drive controller 101, thereby reading information recorded to the optical disk medium 10. In contrast to this, when data are erased and overwritten, a laser beam having erasing power is irradiated onto the optical disk medium 10 in accordance with procedures similar to those at the data recording time.

The signal processing device 102 includes a modulating circuit, a laser driving circuit and a demodulating circuit.

The disk drive unit 100 is also provided with a temperature sensor 104 which measures an atmospheric temperature in the vicinity of the optical disk medium 10 and transmits a signal indicative of the measured temperature to the drive controller 101. The drive controller 101 corrects a laser output of the optical pickup device 103 with the signal processing device 102 in accordance with the atmospheric temperature so that a temperature of the optical disk medium 10 can be set to a predetermined temperature, for example, the aforementioned temperature T1, T2, T3, T4 or T5.

For example, the temperature sensor 104 has a carriage provided with an objective lens and a focusing actuator and has a thermistor thermometer attached to the carriage.

Figure 6:
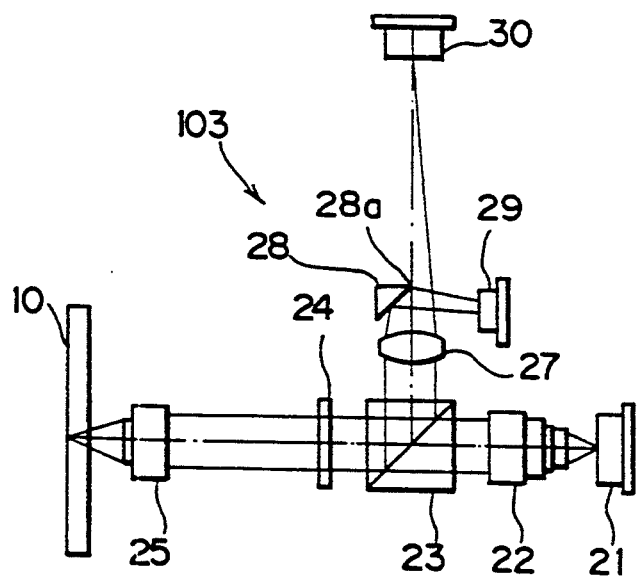
FIG. 6 is a schematic view showing one example of an optical system of an optical pickup device for recording, reproducing and rewriting data to the optical disk in FIG. 3.

FIG. 6 illustrates one example of an optical system of the optical pickup device for recording, reproducing and erasing data from the optical disk 10. This optical pickup device uses a push-pull method as a tracking error detecting method and a knife edge method as a focusing error detecting method.

In FIG. 6, signal light is outputted from a semiconductor laser element 21 and is changed to parallel light by a coupling lens 22. The parallel light is incident to a polarizing beam splitter 28 as P-polarized light. This P-polarized signal light is then transmitted through the polarizing beam splitter 23 to a ¼ wavelength plate 24.

The P-polarized signal light is changed to circularly polarized light by the ¼ wavelength plate 24 when the p-polarized signal light is transmitted through the ¼ wavelength plate 24. The circularly polarized light is converged by an objective lens 25 and is formed as an image on a recording face of the optical disk 10.

Light reflected on the optical disk 10 is approximately changed to parallel light through the objective lens 25 and is then incident to the ¼ wavelength plate 24 again. Thus, after the reflected light is transmitted through the ¼ wavelength plate 24, the reflected light is changed to linearly polarized light having an incident angle and an azimuth perpendicular to each other. Thus, the reflected light is reflected on the polarizing beam splitter 23.

The reflected light reflected on the polarizing beam splitter 23 from the optical disk 10 is converged by a lens 27. A half of this converged light is approximately reflected on a divisional mirror 28 constituting a knife edge and is incident to a light receiving element 29 for detecting a tracking error.

Figure 7:
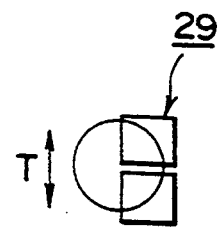
FIG. 7 is a plane view showing a beam spot for detecting a tracking error on a face of a light detecting element.

Referring now to FIG. 7, it illustrates a beam spot for detecting a tracking error on a face of the element 29. The light receiving face of the light receiving element 29 is divided into two divisional faces in a tracking direction T. The tracking direction T is equivalent to a radial direction of the optical disk 10.

As shown in FIG. 6, the remaining half portion of the light beam converged by the lens 27 is incident to a light receiving element 30 for detecting a focusing error. A light receiving face of this light receiving element 30 is divided into two divisional faces on a divisional line parallel to a ridgeline 28a of the divisional mirror 28.

A tracking error signal is obtained on the basis of a difference between light receiving signals outputted from the two divisional light receiving faces of the light receiving element 29. A focusing error signal is obtained on the basis of a difference between light receiving signals outputted from the two divisional light receiving faces of the light receiving element 80. Further, a reproducing signal from the optical disk 10 is obtained on the basis of a sum of the light receiving signals of the light receiving element 29.

An unillustrated objective lens-moving mechanism for moving the objective lens 25 in the tracking direction and a focusing direction is additionally attached to the objective lens 25.

Figure 8:
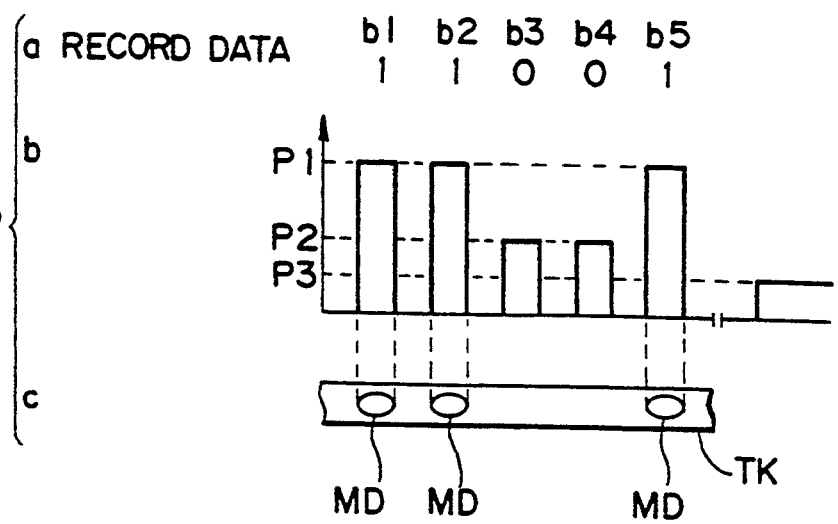
FIG. 8 is a schematic view showing one example of data recording.

When data are recorded to the optical disk 10, as shown in FIGS. 8a to 8c, an output level of the semiconductor laser element 21 is set to a level P1 at a recording timing of the recorded data in a marked position indicative of data value 1 in a state in which a laser beam follows up a recording track TK of the rotated optical disk 10. A portion of the recording track TK of the optical disk 10 in the marked position is heated to a temperature equal to or higher than temperature T5. Further, the output level of the semiconductor laser element 21 is set to a level P2 at a recording timing of the recorded data in an unmarked position indicative of data value 0. A portion of the recording track TK of the optical disk 10 in the unmarked position is heated to a suitable temperature between temperatures T2 and T3.

The heating portion of the recording track TK is dislocated from the laser beam in accordance with rotation of the optical disk 10 so that this heating portion is instantly cooled. Thus, a temperature of the heating portion corresponding to the marked position of the recording track TK is reduced to an atmospheric temperature from temperature T5. Further, a temperature of the heating portion corresponding to the unmarked position of the recording track TK is reduced to an atmospheric temperature from the suitable temperature between temperatures T2 and T3.

As a result, an opaque mark MD is formed in a portion of the recording track TK corresponding to the marked position and a portion of the recording track TK corresponding to the unmarked position remains transparent.

Thus, the opaque mark MD corresponding to the marked position of the recorded data is formed on the recording track TK so that data are recorded to the recording track TK.

When the recorded data are reproduced from the recording track TK, the output level of the semiconductor laser element 21 is set to a level P3 and light reflected on the optical disk 10 is received by the above optical pickup device so that a reproducing signal is formed. The output level P3 at this time is set to an intensity value provided such that no temperature of the recording medium is equal to or higher than temperature T2 and a signal having a sufficient S/N ratio can be obtained in a detecting system of the optical pickup device.

For example, the output levels P1, P2 and P3 of the semiconductor laser element 21 are respectively set to about 4, 2 and 1 milliwatts.

Figure 9:
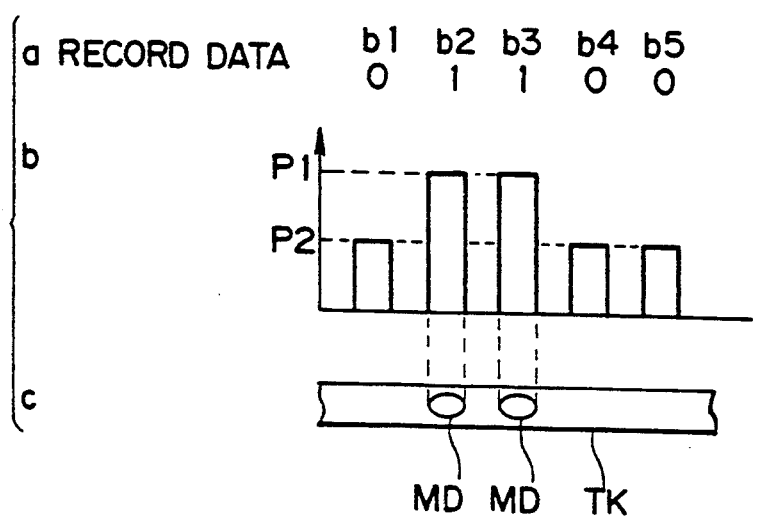
FIG. 9 is a schematic view showing one example of data rewriting.

When the recorded data are rewritten as shown in FIGS. 9a to 9c, similar to the data recording time, an output level of the semiconductor laser element 21 is set to a level P1 at a recording timing of the recorded data in a marked position thereof. The output level of the semiconductor laser element 21 is set to a level P2 at a recording timing of the recorded data in an unmarked position thereof.

Thus, similar to the above case, with respect to a portion of the recording track TK in which no opaque mark MD is previously formed, an opaque mark MD is formed in a portion of the recording track TK corresponding to the marked position. Further, a portion of the recording track TK corresponding to the unmarked position remains transparent.

Further, the forming portion of the opaque mark MD with respect to the recording track TK is heated to a temperature equal to or higher than temperature T5 when this forming portion is located in a mark recording position at a data rewriting time. Accordingly, similar to the above case, the opaque mark MD is formed in this forming portion. When this forming portion of the opaque mark MD is located in an unmarked recording position at the data rewriting time, this forming position is heated to a suitable temperature between temperatures T2 and T3 so that this forming portion becomes transparent.

Thus, in this embodiment, data can be recorded and reproduced and can be rewritten by one disk access so that a data access time can be greatly reduced.

Further, the output level of the semiconductor laser element 21 required at the data recording time is set to be a considerably small value so that a life of the semiconductor laser element 21 can be extended. A heating amount of the semiconductor laser element 21 is reduced so that it is easy to cool an optical disk drive unit using this optical disk 10. Further, it is possible to increase the output level of the semiconductor laser element 21 and increase a rotational speed of the optical disk 10. As a result, the data access time can be further reduced with respect to the optical disk 10.

Since the temperature of the optical recording material layer 3 is not so high, no heat-resisting property, etc. are strictly required with respect to a material used for the protecting layer 2 so that cost of the optical disk 10 can be reduced.

Figure 10:
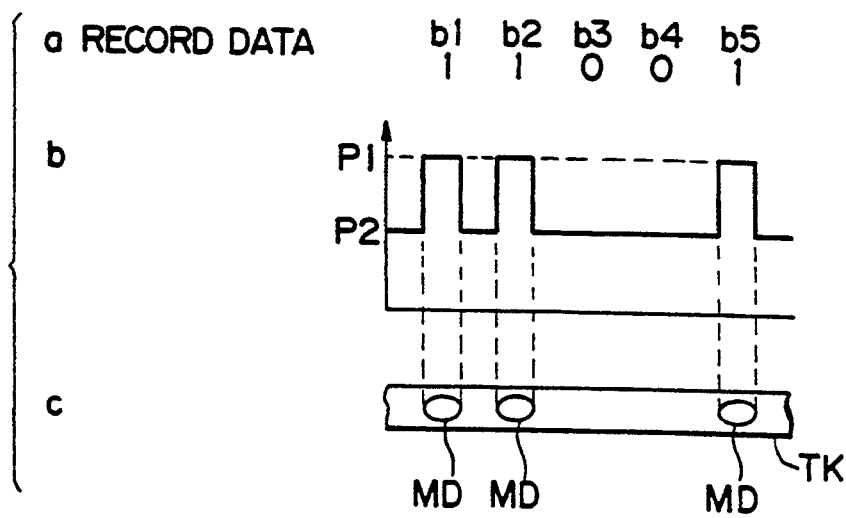
FIG. 10 is a schematic view showing another example of data recording.

FIGS. 10a and 10c show another example of a driving method of the semiconductor laser element 21 at the data recording time.

In this case, the output level of the semiconductor laser element 21 is set to a level P2 at any time and is set to a level P1 at a recording timing of recorded data in a marked position thereof.

Thus, similar to the above-mentioned embodiment, an opaque mark MD is formed in a portion of a recording track TK corresponding to the marked position and the remaining portion of the recording track TK remains transparent.

Figure 11:
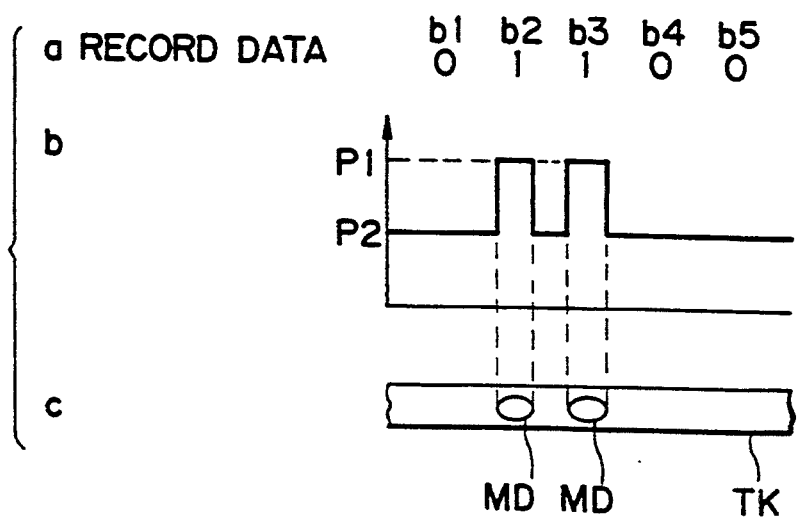
FIG. 11 is a schematic view showing another example of data rewriting.

When the recorded data are rewritten as shown in FIGS. 11a to 11c, similar to the data recording time, the output level of the semiconductor laser element 21 is set to a level P2 at any time and is set to a level P1 at a recording timing of the recorded data in a marked position.

Thus, similar to the above case, with respect to a portion of the recording track TK in which no opaque mark MD is previously formed, the opaque mark MD is formed in a portion of the recording track TK corresponding to the marked position and the remaining portion of the recording track TK remains transparent.

Further, the forming portion of the opaque mark MD with respect to the recording track TK is heated to a temperature equal to or higher than temperature T5 when this forming portion is located in a mark recording position at a data rewriting time. Accordingly, similar to the above case, the opaque mark MD is formed in this forming portion. When this forming portion of the opaque mark MD is located in an unmarked recording position at the data rewriting time, this forming position is heated to a suitable temperature between temperatures T2 and T3 so that this forming portion becomes transparent.

Thus, data are recorded to the recording track TK of the optical disk 10 and the recorded data can be rewritten.

Figure 12:
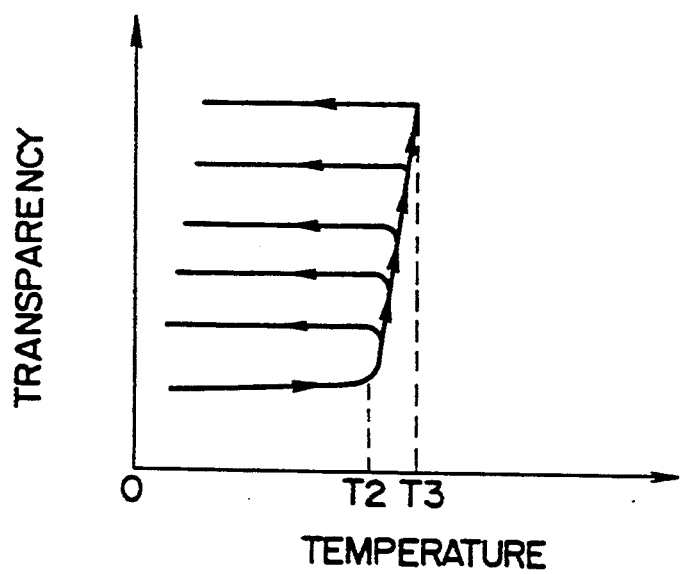
FIG. 12 is a graph showing one example of half tone characteristics of the optical recording material in FIG. 1.

When the optical recording material is heated stepwise between the above temperatures T2 and T3, transparency of the optical recording material is changed stepwise as shown in FIG. 12 when the optical recording material is cooled. Multivalued data can be recorded to a recording medium by using this property.

Figure 13:
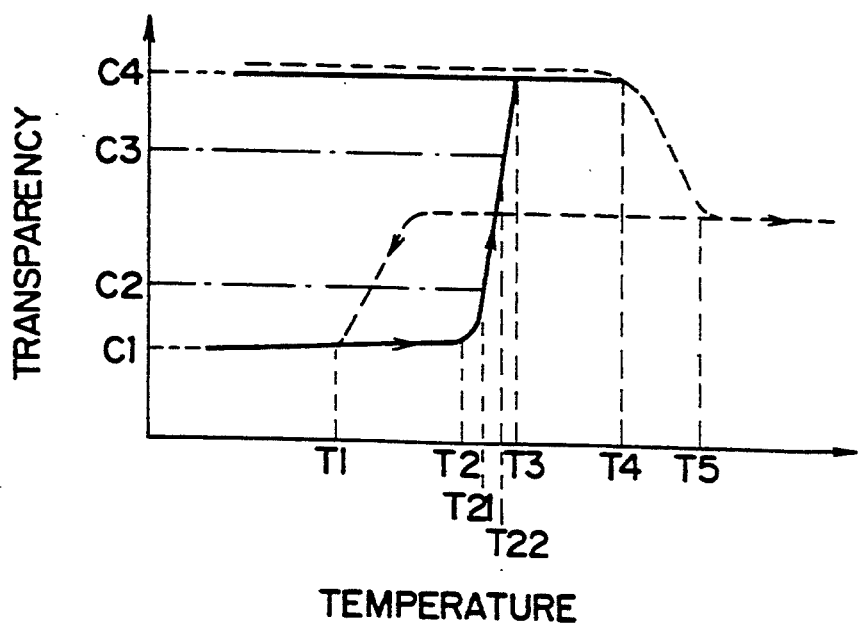
FIG. 13 is a graph for explaining one example of three-valued data recording.

For example, as shown in FIG. 13, when the recording medium is heated to temperatures T21 and T22, transparency of the recording medium is respectively set to C2 and C3 after cooling. Here, T2<T21<T22<T3 is set. C1 is a transparency of the recording medium when the recording medium is completely opaque. C2 is a transparency of the recording medium when the recording medium is completely transparent. In this case, C4<C3<C2<C1 is formed.

When the transparency of the recording medium is gradually increased from an opaque state, the amount of a light component reaching the reflecting layer 4 through the optical recording material layer 3 is increased so that an intensity level of light reflected on the recording medium is changed in accordance with its transparency.

Therefore, for example, a data value 0 is set to show the transparency C1. A data value 1 is set to show an arbitrary value between the transparencies C2 and C3. Further, a data value 2 is set to show the transparency C4. In this case, three-valued data can be recorded to the recording medium. The three-valued data can be suitably judged by judging the intensity level of light reflected on the recording medium at three stages. In this case, it is desirable to experimentally set an intermediate transparency of the recording medium.

Thus, multivalued data can be recorded to the recording medium so that a data recording capacity of the recording medium can be greatly increased.

Further, the transparency of the recording medium can be continuously changed so that an analog signal can be directly recorded to the recording medium and an application range of the recording medium can be greatly widened.

Further, it is preferable to suitably control an output level of the semiconductor laser element at a detected atmospheric temperature.

In the above embodiments, an initial operating state of the recording medium is set to a transparent state. However, similar to the above embodiments, data can be recorded, reproduced and rewritten even when the initial operating state of the recording medium is set to an opaque state.

In the above embodiments, the recording medium in the present invention is formed by an optical disk, but can be formed in another shape such as a card shape.

Many widely embodiments of the present invention may be constructed without departing from the spirit and the scope of the present invention is not limited to the specific embodiments described in the specification, except as defined in the appended claims.

What is claimed is:

1. An optical recording medium comprising:
   a substrate made of a transparent material;
   an optical recording layer having a transparency reversibly changed in accordance with temperature thereof;
   a reflecting layer for reflecting a light which passes through said substrate and said optical recording layer, said substrate, said optical recording layer and said reflecting layer being laminated with each other;
   a plurality of guide grooves for guiding a laser beam for recording, reproducing and erasing data; and
   a plurality of recording tracks, formed in each of said guide grooves, for recording data.

2. An optical recording medium as claimed in claim 1, wherein said optical recording layer is made of an optical recording material including a resin base material into which an organic low molecular substance is dispersed.

3. An optical recording medium as claimed in claim 2, wherein thermoplastic resin is used as said resin base material and higher saturated fatty acid is used as said organic low molecular substance.

4. An optical recording medium as claimed in claim 2, wherein said optical recording medium further comprises a protecting layer between said substrate and said optical recording layer for protecting said recording layer.

5. An optical recording process using an optical recording medium comprising a substrate made of a transparent material, an optical recording layer having a transparency reversibly changed in accordance with temperature thereof, and a reflecting layer for reflecting a light which passes through said substrate and said optical recording layer, said substrate, said optical recording layer and said reflecting layer being laminated with each other, a plurality of guide groves for guiding a laser beam having a predetermined spot diameter for recording, reproducing and erasing data and a plurality of recording tracks, formed in each of said guide grooves, for recording data, said optical recording process comprising the steps of:
  setting said optical recording layer to be in an opaque state at an initial operating time of the optical recording medium guiding the laser beam with the plurality of guide grooves;
  when recording data in said optical recording layer, controlling and setting the output level of said laser beam to a value provided such that a temperature of said recording medium in a bit position corresponding to a marked position of recorded data is increased to a first predetermined temperature for keeping said optical recording layer to the opaque state, and controlling and setting the output level of said laser beam to a value provided such that the temperature of the recording medium in a bit position except for the marked position is increased to a second temperature for changing said optical recording layer to a transparent state and lower than said first predetermined temperature;
  when reproducing data recorded in said optical recording layer, controlling and setting the output level of said laser beam to a value provided such that the temperature of said recording layer is set to a third temperature lower than said second temperature, and
  reproducing the data recorded in said optical recording layer by illuminating the optical recording layer with said laser beam.

6. An optical recording process as claimed in claim 5, wherein said optical recording layer comprises an optical recording material including a resin base material into which an organic low molecular substance is dispersed.

7. An optical recording process as claimed in claim 6, wherein said resin base material comprises a thermoplastic resin and said organic low molecular substance comprises a higher saturated fatty acid.

8. An optical recording process using an optical recording medium comprising a substrate made of a transparent material, an optical recording layer having a transparency reversibly changed in accordance with temperature thereof, and a reflecting layer for reflecting a light which passes through said substrate and said optical recording layer, said substrate, said optical recording layer and said reflecting layer being laminated with each other, a plurality of guide groves for guiding a laser beam having a predetermined spot diameter for recording, reproducing and erasing data and a plurality of recording tracks, formed in each of said guide grooves, for recording data, said optical recording process comprising the steps of:
  setting said recording layer to be in a transparent state at an initial operating time of the optical recording medium guiding the laser beam with the plurality of guide grooves;
  when recording data in said optical recording layer, controlling and setting the output level of said laser beam to a value provided such that a temperature of said recording medium in a bit position except for a marked position of recorded data is increased to a first predetermined temperature for changing said recording layer to an opaque state, and controlling and setting the output level of said laser beam to a value provided such that the temperature of the recording medium in a bit position corresponding to the marked position is increased to a second temperature for keeping said recording layer in the transparent state and lower than said first predetermined temperature;
  when reproducing data recorded in said optical recording layer, controlling and setting the output level of said laser beam to a value provided such that the temperature of said optical recording layer is set to a third temperature lower than said second temperature, and
  reproducing the data recorded on said optical recording layer by illuminating the optical recording layer with said laser beam.

9. An optical recording process as claimed in claim 8, wherein said optical recording layer comprises an optical recording material including a resin base material into which an organic low molecular substance is dispersed.

10. An optical recording process using an optical recording medium comprising a substrate made of a transparent material, an optical recording layer having a transparency reversibly changed in accordance with temperature thereof, and a reflecting layer for reflecting a light which passes through said substrate and said optical recording layer, said substrate, said optical recording layer and said reflecting layer being laminated with each other, a plurality of guide groves for guiding a laser beam having a predetermined spot diameter for recording, reproducing and erasing data and a plurality of recording tracks, formed in each of said guide grooves, for recording data, said optical recording process comprising the steps of:
  setting said recording layer to be in an opaque state at an initial operating time of the optical recording medium guiding the laser beam with the plurality of guide grooves; and
  when recording data in said optical recording layer, controlling and setting the output level of said laser beam to a value provided such that a temperature of said recording medium in each of bit positions is increased to a temperature for setting said recording layer in an opaque state corresponding to a value of multivalued recording data.

11. An optical recording process as claimed in claim 10, wherein said value of multivalued recording data is an analog value of an analog signal.

12. An optical recording process as claimed in claim 11, wherein said optical recording layer comprises an optical recording material including a resin base material into which an organic low molecular substance is dispersed.

13. An optical recording process as claimed in claim 10, wherein said optical recording layer comprises an optical recording material including a resin base material into which an organic low molecular substance is dispersed.

14. An optical recording process using an optical recording medium comprising a substrate made of a transparent material, an optical recording layer having a transparency reversibly changed in accordance with temperature thereof, and a reflecting layer for reflecting a light which passes through said substrate and said optical recording layer, said substrate, said optical recording layer and said reflecting layer being laminated with each other, a plurality of guide groves for guiding a laser beam having a predetermined spot diameter for recording, reproducing and erasing data and a plurality of recording tracks, formed in each of said guide grooves, for recording data, said optical recording process comprising the steps of:

setting said recording layer to be in a transparent state at an initial operating time of the optical recording medium guiding the laser beam with the plurality of guide grooves; and when recording data in said optical recording layer, controlling and setting the output level of said laser beam to a value provided such that a temperature of said recording medium in each of bit positions is increased to a temperature for setting said recording layer to an opaque state corresponding to a value of multivalued recording data.

15. An optical recording process as claimed in claim 14, Wherein said value of multivalued recording data is an analog value of an analog signal.

16. An optical recording process as claimed in claim 15, wherein said optical recording layer comprises an optical recording material including a resin base material into which an organic low molecular substance is dispersed.

17. An optical recording process as claimed in claim 14, wherein said optical recording layer comprises an optical recording material including a resin base material into which an organic low molecular substance is dispersed.

* * * * *